Figure 1:
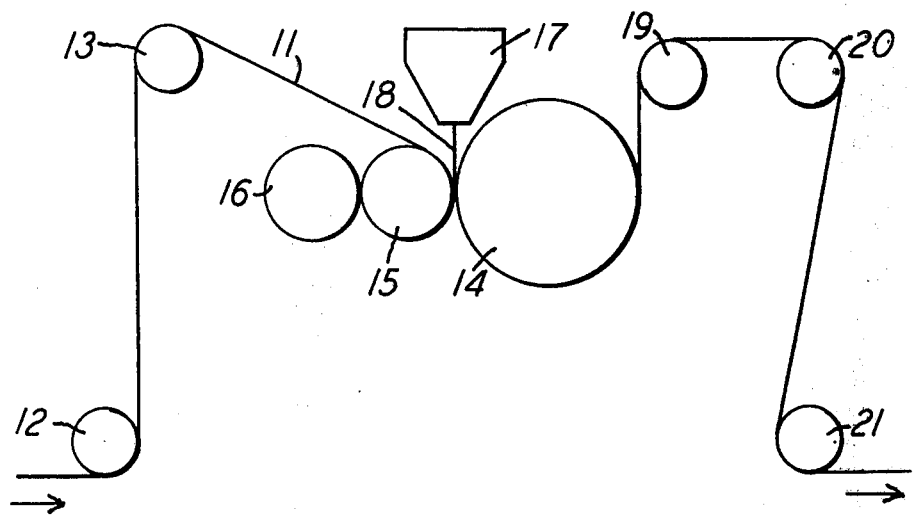

United States Patent [19]

Hill

[11] 3,959,546

[45] May 25, 1976

[54] TEXTURED PHOTOGRAPHIC BASE PAPER PROCESS AND PRODUCT

[75] Inventor: John A. Hill, Pulaski, N.Y.

[73] Assignee: Schoeller Technical Papers Company, Pulaski, N.Y.

[22] Filed: Apr. 15, 1974

[21] Appl. No.: 460,698

[52] U.S. Cl.................. 428/141; 96/85; 427/278; 427/288; 427/362; 427/369; 428/336; 428/511; 428/537
[51] Int. Cl.² ............... G03C 1/86; B05D 5/00; B05D 3/12
[58] Field of Search ......... 96/85; 117/10, 11, 64 C, 117/65.2, 111 R; 427/278, 288, 362, 369; 428/141, 336, 511, 537

[56] References Cited
UNITED STATES PATENTS

| | | | |
|---|---|---|---|
| 3,110,608 | 11/1963 | Brunson et al.................. | 117/64 X |
| 3,148,059 | 9/1964 | Brunson et al.................. | 117/10 X |
| 3,317,334 | 5/1967 | Norton........................... | 117/38 X |
| 3,411,908 | 11/1968 | Crawford et al............... | 117/60 X |
| 3,595,943 | 7/1971 | Brunson et al.................. | 117/10 X |

FOREIGN PATENTS OR APPLICATIONS 1,043,703   9/1966   United Kingdom

*Primary Examiner*—Michael R. Lusignan
*Attorney, Agent, or Firm*—Wilson G. Palmer

[57] ABSTRACT

A polyolefin coated photographic base paper having a silk-like textured surface is prepared by extrusion coating the polyethylene on the photographic paper and, while the polyolefin is still plastic, forming the surface of the polyolefin on an engraved chill roll. Pattern depths of 0.4 to 0.7 mils can be produced on the polyolefin surface by this process using polyolefin films as thin as one mil.

10 Claims, 2 Drawing Figures

U.S. Patent   May 25, 1976   3,959,546

TEXTURED PHOTOGRAPHIC BASE PAPER PROCESS AND PRODUCT

This invention relates to the production of photographic base papers. In particular, it relates to the production of photographic base papers having a textured silk-like surface.

Photographic base papers have been produced in a variety of surfaces, i.e. glossy, matte and various embossed patterns. For many years, photographic base papers consisted of a paper base stock that had been coated with an aqueous composition of barium sulfate (baryta) and gelatin. This resulted in a matte finish surface. If a glossy finish was required, the coated paper was supercalendered. In the case of an embossed surface, the coated paper was run through an embossing calendar. Many surfaces were obtained by embossing, a popular one being a silk-like pattern.

Polyethylene coated papers were introduced in recent years as photographic base papers. The use of such a base paper is shown, for example, in Crawford U.S. Pat. No. 3,411,908. For the most part, surface textures similar to those mentioned above were desired. The use of glossy or matte chill rolls on extruders to prepare the corresponding glossy or matte surfaces is standard practice as noted in the use of a matte chill roll in Kemp Canadian Pat. No. 795,773.

In order to obtain a silk-like surface on polyethylene coated papers, attempts had been made to use the same procedure as on the baryta coated papers by running the polyethylene coated paper through an embossing calender with an engraved steel roll and a cotton filled backing roll. It became readily apparent that this procedure was not well suited for embossing polyethylene coated papers. The polyethylene resin, being much softer than the paper or baryta coating required less pressure to produce the desired pattern and the depth of the pattern became more susceptible to variations in the pressure of the embossing rolls. This resulted in a much greater variation in embossing depth, both across the web and in the machine direction, than that experienced with baryta papers. Another problem was of much greater magnitude, resulting in excessive losses of paper due to defects. This was brought about by small lumps of polyethylene becoming detached from the coated surface and sticking on the engraved steel roll. As these lumps of polyethylene covered the engraved pattern, they resulted in repetitive unembossed spots which were easily seen with the naked eye. Furthermore, the polyethylene coating and embossing calender required two separate operations which could not be combined in line.

I have found that surface resembling the silk-like pattern produced by the embossing calender on the baryta paper could be produced without the above disadvantages on polyethylene coated base paper using an engraved chill roll in line with the extruder during the coating operation. The engraved chill roll required a pattern depth of 0.4 to 0.7 mils to give the required silk-like surface. I have found that such a pattern can be reproduced on the surface of the polyethylene film as low as 1 mil (25–26 grams per square meter) in thickness.

The method of this invention is best explained by reference to the drawings. As shown in FIG. 1, a web of photographic paper 11 from a roll (not shown) is guided by rolls 12 and 13 into a nip formed by chill roll 14 and rubber roll 15. A steel backing roll 16 provides a pressure in the nip of rolls 14 and 15 in the preferred operating range of 70 to 115 pounds per lineal inch. The polyethylene resin is extruded from the extruder 17 in a film 18 into the nip formed by rolls 14 and 15 where it is adhered to the paper and simultaneously the film surface forms a replica of the chill roll pattern. Further contact with the chill roll cools and sets the resin. The paper 11 and the adhered polyethylene film 18 are stripped from the chill roll 14 by roll 19 and guided by rolls 20 and 21 to a winder (not shown).

Any of the low, medium, and high density polyethylenes may be used in this process. When using any of these polyethylenes in the extruder, the extrusion melt temperatures are maintained at 550° to 650°F. Normally, the temperature of the polyethylene film 18 as it enters the nip between the paper 11 and the chill roll 14 is only a few degrees below the melt temperature. The temperature of the chill roll has been varied between 50° and 90°F without adverse effect on the quality of the textured surface.

Figure 2:
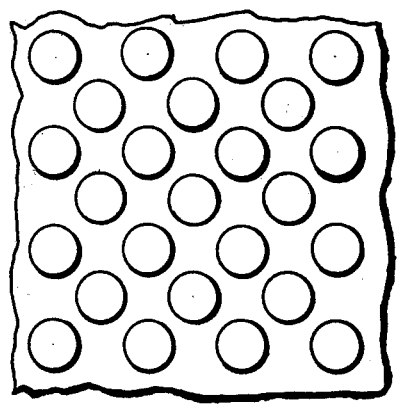

The chill roll 14 is an engraved chrome chrome plated steel roll having conical depressions approximately 16 mils in diameter in a closely spaced uniform pattern. The depth of the conical depressions are 0.4 to 0.7 mils. The pattern of the roll is illustrated by FIG. 2 which shows a section of the surface of the chill roll on an enlarged scale.

The surface pattern produced by the chill roll, as compared to a matte surface, is completely symmetrical and much deeper. For example, Canadian Pat. No. 795,773 lists the depth of the matte pattern as 30–40 micro inches (0.03 to 0.04 mils). In contrast to this, the surface pattern produced by the invention is a replicate of the chill roll surface and thus the film contains conical raised portions or peaks wherein the difference in height between valleys and peaks is 0.4 to 0.7 mils. It was found that with this depth of pattern it was necessary to maintain a coating weight equivalent at least to approximately 1 mil of polyethylene.

EXAMPLE

A 7.5 mil photographic paper which had been previously coated with approximately 1.25 mil of polyethylene was coated on the opposite side with 43 grams per square meter (1.7 mil) of low density polyethylene containing 7%, by weight, of titanium dioxide using the apparatus and process described with respect to FIG. 1 of the drawings. The melt temperature was 612°F and the chill roll temperature was 70°F. A nip pressure of 70 pounds per lineal inch pressure between the chill roll and rubber roll was used. The coating speed was approximately 100 feet per minute.

The resultant polyethylene coated photographic base paper had a uniform silk-like surface with no skips or other observable flaws. Base paper treated in the above manner was corona treated, subbed with a standard subbing coating of gelatin and subsequently coated with a standard black and white light sensitive silver halide emulsion and used as a positive print paper. The print was excellent in quality and had a pleasing silk-like surface.

It is obvious that other polyolefins, such as polypropylene could be used in place of polyethylene in this process. However, for polypropylene the extrusion melt temperature should be maintained between 550° and 600°F.

Coating speeds normal to the extrusion coating of other photographic papers can be used in the process of this invention. Speeds up to 450 feet per minute have been successfully used whereby the product produced was entirely satisfactory for use as a photographic base paper.

What is claimed is:

1. Process for the production of a polyolefin coated photographic base paper having a textured silk-like surface for coating with a light sensitive silver halide emulsion to form a photographic print paper comprising the steps of
    a. applying a continuously extruded molten film of at least 1 mil of a polyolefin to a traveling photographic paper web at a point where the web enters a nip between a patterned chill roll and a rubber roll,
    b. adhering said film to said paper web and simultaneously imparting a pattern of closely spaced raised portions having a height of 0.4 to 0.7 mils to the surface of said film by maintaining a pressure nip between said chill roll and said rubber roll, and,
    c. cooling said formed film surface to a temperature at which said pattern is set, thereby replicating the pattern on the chill roll.

2. The process of claim 1 in which the polyolefin is polyethylene.

3. The process of claim 2 in which the pressure of said nip is approximately 70 to 115 pounds per lineal inch.

4. The process of claim 2 in which the polyethylene is extruded at a temperature of 550° to 650°F and the temperature of the chill roll is 50 to 90°F.

5. A photographic base paper for coating with a light sensitive silver halide emulsion to form a photographic print paper having a silk-like surface comprising a photographic paper, a polyolefin film of at least 1 mil thickness adhered to one side of said paper wherein the exposed surface of said polyolefin film carries a uniform pattern of closely spaced raised portions having a height of 0.4 to 0.7 mils.

6. The process of claim 1 in which the closely spaced raised portions are conical in shape and have a diameter of approximately 16 mils.

7. The photographic base paper of claim 1 in which the closely spaced raised portions are conical in shape and have a diameter of approximately 16 mils.

8. The photographic base paper of claim 7 wherein the polyolefin film is a polyethylene film.

9. The photographic base paper of claim 8 wherein the paper carries a second film of polyethylene on the side opposite the patterned surface.

10. The photographic base paper prepared by the process of claim 4.

* * * * *